(12) United States Patent (10) Patent No.: US 12,370,514 B2
Yamada et al. (45) Date of Patent: Jul. 29, 2025

(54) WET ATOMIZER

(71) Applicant: SUGINO MACHINE LIMITED, Uozu (JP)

(72) Inventors: Yuuya Yamada, Uozu (JP); Kenichi Harashima, Uozu (JP); Kuniaki Tanaka, Uozu (JP)

(73) Assignee: SUGINO MACHINE LIMITED, Uozu (JP)

( * ) Notice: Subject to any disclaimer, the term of this patent is extended or adjusted under 35 U.S.C. 154(b) by 492 days.

(21) Appl. No.: 17/892,608

(22) Filed: Aug. 22, 2022

(65) Prior Publication Data

US 2023/0079337 A1 Mar. 16, 2023

(30) Foreign Application Priority Data

Sep. 15, 2021 (JP) .................................. 2021-150444

(51) Int. Cl.
*B01J 2/06* (2006.01)
*H01M 10/0562* (2010.01)

(52) U.S. Cl.
CPC ........... *B01J 2/06* (2013.01); *H01M 10/0562* (2013.01); *H01M 2300/0068* (2013.01)

(58) Field of Classification Search
CPC ................. B01J 2/06; H01M 10/0562; H01M 2300/0068
USPC .......................................................... 55/502
See application file for complete search history.

(56) References Cited

U.S. PATENT DOCUMENTS

| 4,372,853 A * | 2/1983 | Mayfield .................. G21F 9/02 210/450 |
| 5,628,665 A | 5/1997 | Lang et al. |
| 5,695,536 A * | 12/1997 | Fabrizi .................... B05B 14/43 55/385.2 |
| 6,568,540 B1 * | 5/2003 | Holzmann ........... B01D 29/016 55/497 |

(Continued)

FOREIGN PATENT DOCUMENTS

| JP | 2003-311177 A * | 11/2003 |
| JP | 2006-214539 A * | 8/2006 |

(Continued)

OTHER PUBLICATIONS

English Machine Translation of JP 2003-311177 A (Year: 2003).*

(Continued)

*Primary Examiner* — Charles S Bushey
(74) *Attorney, Agent, or Firm* — United IP Counselors, LLC (57) ABSTRACT

Provided is a wet atomizer for processing all-solid-state battery raw materials while ensuring sealing property, operability after completion of processing, and maintenance property. The wet atomizer includes a liquid supply pump for supplying the all-solid-state battery raw materials, a pressure intensifier for pressurizing the all-solid-state battery raw materials supplied from the liquid supply pump, a high-pressure filter for filtering the all-solid-state battery raw materials pressurized by the pressure intensifier, a chamber for injecting the all-solid-state battery raw materials filtered by the high-pressure filter, a sealing member for sealing the space for processing the all-solid-state battery raw materials, and an inert gas supply unit for supplying an inert gas to the sealing member.

20 Claims, 7 Drawing Sheets

(56) References Cited

U.S. PATENT DOCUMENTS

| | | | | |
|---|---|---|---|---|
| 7,976,604 | B2* | 7/2011 | Desjardins | B01D 46/0005 292/85 |
| 2002/0020156 | A1* | 2/2002 | Goerg | F02M 35/024 55/497 |
| 2006/0080949 | A1* | 4/2006 | Moriyama | F02M 35/024 55/502 |
| 2014/0338295 | A1* | 11/2014 | Dworatzek | B01D 46/2414 55/502 |
| 2020/0006808 | A1* | 1/2020 | Utsuno | H01B 13/00 |

FOREIGN PATENT DOCUMENTS

| | | | |
|---|---|---|---|
| JP | 2007-083133 A | 4/2007 | |
| JP | 2007144250 A | 6/2007 | |
| JP | 2016117003 A | 6/2016 | |
| JP | 2018012063 A | 1/2018 | |
| WO | WO 2011/113336 A1 * | 9/2011 | |
| WO | 2018164224 A1 | 9/2018 | |

OTHER PUBLICATIONS

English Machine Translation of JP 2006-214539 A (Year: 2006).*
English Machine Translation of JP 2007-083133 A (Year: 2007).*
English Machine Translation of JP 2007-114250 A (Year: 2007).*
English Machine Translation of WO 2011/113336 A1 (Year: 2011).*
English Machine Translation of JP 2018-012063 A (Year: 2018).*
Extended European Search Report mailed on Jan. 26, 2023 in a corresponding European Patent Application No. 22190911.2 (8 pages).

* cited by examiner

WET ATOMIZER

CROSS-REFERENCE TO RELATED APPLICATIONS

This application claims the benefit of priority to Japanese Patent Application No. 2021-150444, filed on Sep. 15, 2021, the entire contents of which are hereby incorporated by reference.

BACKGROUND

1. Technical Field

The present invention relates to a wet atomizer for processing all-solid-state battery raw materials.

2. Description of the Background

In a battery using a liquid electrolyte material such as a conventional lithium ion battery, a positive electrode material and a negative electrode material are separated with a separator, and a liquid binder is interposed in the gap. The positive electrode material is Ni, Mn, Co, $LiCoO_2$, etc. The negative electrode material is graphite or the like. The separator is a porous resin. The binder is a polymeric material. The improvement of the positive electrode material, the negative electrode material, the separator, the binder itself, or the improvement of the packaging method as a battery have been studied.

Recently, a battery using a solid electrolyte material instead of a liquid binder (electrolyte material) has been studied. In a battery using the solid electrolyte material, no separator is required. Efforts have been made to increase the degree of freedom in the movement of charges traveling between the positive electrode material and the negative electrode material in order to generate electricity, and to improve the output efficiency of the current. Since the positive electrode material, the negative electrode material, and the solid electrolyte material are all composed of solids, they are referred to as all-solid-state battery. As a solid electrolyte material used for the all-solid-state battery, an oxide-based solid electrolyte material and a sulfide-based solid electrolyte material have been studied.

Further, the sulfide-based solid electrolyte particles described in WO 2018/164224 (hereinafter, "Patent Literature 1") are atomized in a glove box under a nitrogen atmosphere using a jet mill device (NJ-50, manufactured by Aisin Nanotechnology Co., Ltd.). Further, a processing condition is disclosed in which the processing rate is 180 g/hour (processing time: 10 minutes), nitrogen is used as the pulverizing gas, the input gas pressure is 2.0 MPa, and the pulverizing gas pressure is 2.0 MPa.

BRIEF SUMMARY

Unlike liquid battery, the all-solid-state battery has no separator. Thus, in order to make the positive electrode material, the negative electrode material, and the solid electrolyte material uniform, it is necessary to improve the uniformity of each material and all materials constituting the battery.

In addition, a method of bringing the positive electrode material, the negative electrode material, and the solid electrolyte material into an integral solid state by pressure bonding has not been established.

The oxide-based solid electrolyte material is La, Li, Ti, O, or the like. These materials have high hardness, and are not easily crimped into an integral solid state. In addition, since these materials have high hardness, it is difficult to downsize the solid electrolyte material.

The sulfide-based solid electrolyte material is made of Li, Ge, P, S, or the like. These materials are soft, and it is difficult to maintain uniformity to form in an integral solid state. Further, the sulfide-based solid electrolyte material has characteristics of reacting with water. Reacting the sulfide-based solid electrolyte material with water generates a highly toxic gas derived from sulfide, which may cause harm to workers and users of battery.

Both of the oxide-based solid electrolyte material and the sulfide-based solid electrolyte material have such problems, and at present, mass production of the solid electrolyte material has not been achieved. In particular, in order to produce the sulfide-based solid electrolyte material, it is required to develop an apparatus which ensures sealing property, operability after completion of processing, and maintenance property.

Patent Literature 1 describes at least an apparatus concept of manufacturing sulfide-based solid electrolyte particles, but a detailed apparatus configuration is not disclosed.

An object of the present invention is to provide a wet atomizer for processing the all-solid-state battery raw materials in a state in which sealing property, operability after completion of processing, and maintenance property are ensured.

A first aspect of the present invention provides a wet atomizer, including:
  a liquid supply pump configured to supply all-solid-state battery raw materials;
  a pressure intensifier configured to pressurize the all-solid-state battery raw materials supplied from the liquid supply pump;
  a high-pressure filter configured to filter the all-solid-state battery raw materials pressurized by the pressure intensifier;
  a chamber configured to inject the all-solid-state battery raw materials filtered by the high-pressure filter;
  a sealing member configured to seal a space for processing the all-solid-state battery raw materials; and
  an inert gas supply unit configured to supply inert gas to the sealing member.

The wet atomizer according to the present invention achieves to process the all-solid-state battery raw materials in a state in which the sealing property, the operability after completion of processing, and the maintenance property are ensured.

DETAILED DESCRIPTION

First Embodiment

Figure 1:
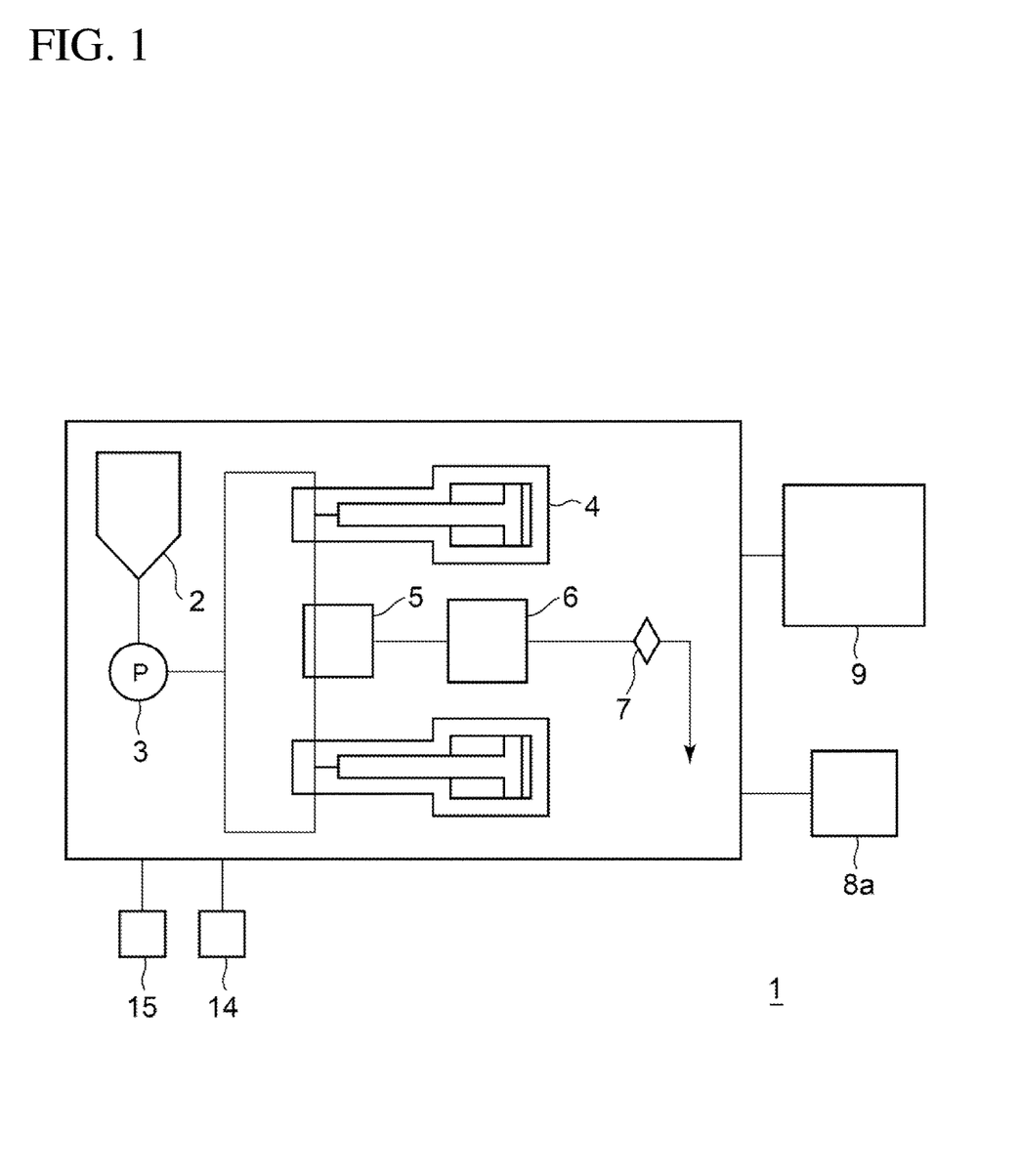
FIG. 1 shows a system diagram of a wet atomizer according to a first embodiment.
Figure 2:
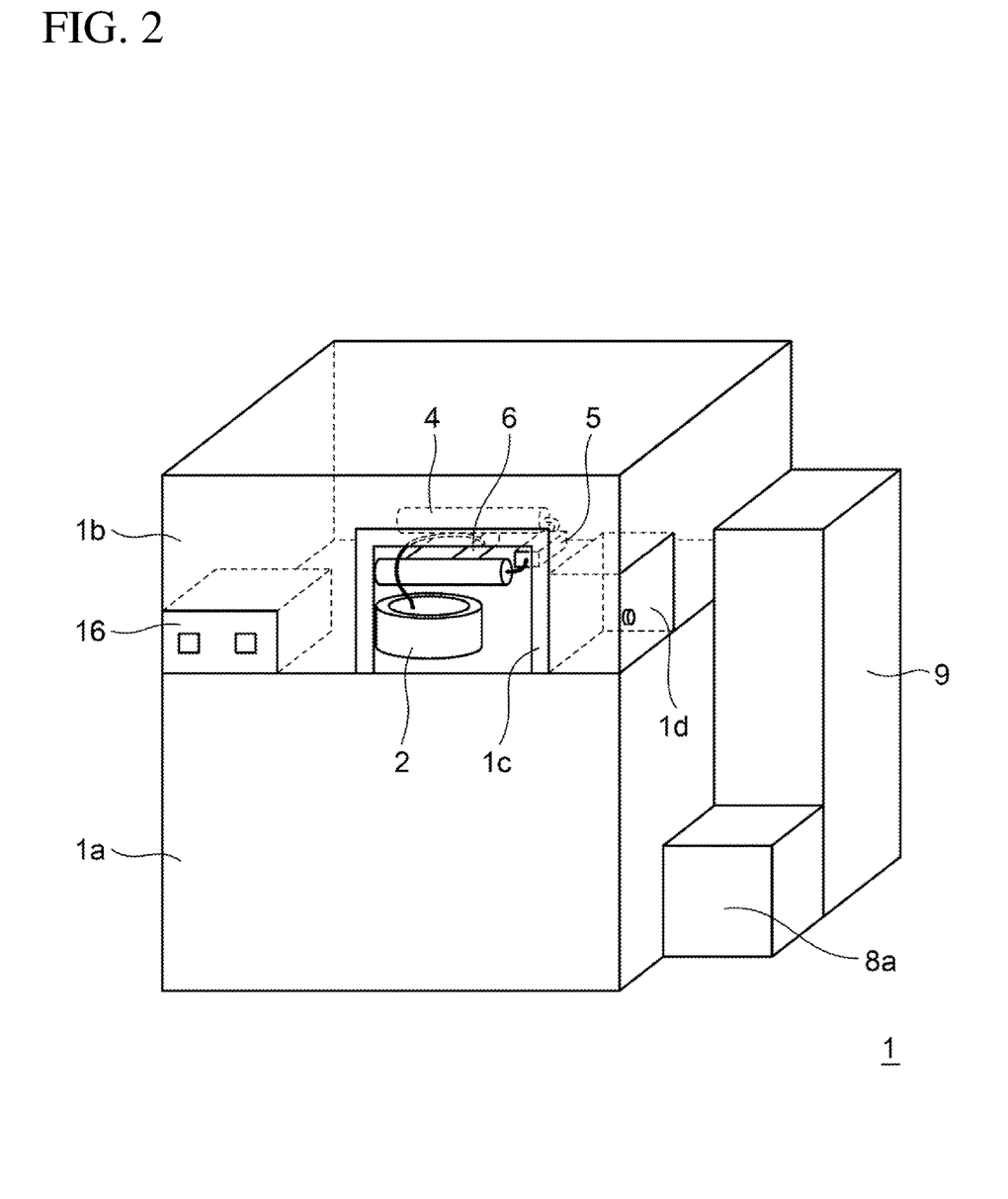
FIG. 2 is a perspective view of a wet atomizer according to the first embodiment.

Embodiments will be described below with reference to the drawings as appropriate. As shown in FIGS. 1 and 2, a wet atomizer 1 according to the present embodiment includes a raw material tank 2, a liquid supply pump 3, a pressure intensifier 4, a high-pressure filter 5, a chamber 6, and a heat exchanger 7.

The raw material tank 2 stores a slurry of all-solid-state battery raw materials M. The liquid supply pump 3 supplies the all-solid-state battery raw materials M in the raw material tank 2 to the pressure intensifier 4. The pressure intensifier 4 pressurizes the all-solid-state battery raw materials M supplied from the liquid supply pump 3. The high-pressure filter 5 filters coarse particles of the pressurized all-solid-state battery raw materials M. The chamber 6 performs the atomization process by high-pressure injection of the all-solid-state battery raw materials M from the nozzle (not shown) at 100 to 245 MPa. By repeating the atomization process a plurality of times, the physical properties such as the particle diameter can be changed.

The raw material tank 2 temporarily stores the all-solid-state battery raw materials M. The size of the raw material tank 2 may be appropriately changed in accordance with the prototype production stage and the mass production stage. In addition, as a material of the raw material tank 2, a metal such as stainless steel or the like is appropriately selected in accordance with the all-solid-state battery raw materials M and the solvent used.

The all-solid-state battery raw materials M is, for example, an oxide-based solid electrolyte material or a sulfide-based solid electrolyte material. The oxide-based solid electrolyte material is La, Li, Ti, O, or the like. The sulfide-based solid electrolyte material is made of Li, Ge, P, S, or the like.

As a solvent, a combination in which a material is not oxidized is selected for the oxide-based solid electrolyte material. A combination in which hydrogen sulfide is not generated must be selected for the sulfide-based solid electrolyte material.

The all-solid-state battery raw materials M and the solvent are mixed and stored in the raw material tank 2. There is no problem if the physical properties are not changed by a solvent or the like. When the physical properties are changed by the solvent or the like, the atomization processing may be performed by waiting for a lapse of time such as 10 minutes, 30 minutes, 1 hours, or the like until an appropriate chemical processing is performed in the raw material tank 2

In the specification, the oxide-based solid electrolyte material, the sulfide-based solid electrolyte material, or the like is exemplified, but it is needless to say that any material may be used as long as it constitutes an all-solid-state battery raw materials M.

The liquid supply pump 3 supplies the all-solid-state battery raw materials M in order to appropriately pass or circulate the all-solid-state battery raw materials M through the flow path of the wet atomizer 1. The liquid supply pump 3 needs only to obtain power sufficient to supply the all-solid-state battery raw materials M. The liquid supply pump 3 may be a commercially available liquid supply pump or the like.

The pressure intensifier 4 pressurizes the all-solid-state battery raw materials M. By moving a piston of the pressure intensifier 4 using a hydraulic pump (not shown) or an electric motor (not shown), the all-solid-state battery raw materials M are pressurized in a pressure chamber. The pressurizing pressure may be appropriately changed, for example, from 100 to 245 MPa. Although two of the pressure intensifiers 4 are arranged in FIG. 1, the number of the pressure intensifier 4 may be changed depending on the volume of the all-solid-state raw materials M, the pressure required for the pressurization, and flow rate.

The high-pressure filter 5 filters contaminants contained in the all-solid-state battery raw materials M and particles having a size that cannot be processed. The passage diameter, network structure, and the like of the high-pressure filter 5 may be appropriately changed in accordance with the particle size and the like of the all-solid-state battery raw materials M.

The chamber 6 performs the atomization processing by injecting the all-solid-state battery raw materials M at high pressure. For example, the chamber 6 is for atomizing by colliding the all-solid-state battery materials M toward a ball from a single nozzle 6a. The chamber 6 may be for atomizing by colliding the all-solid-state battery materials M to each other from two or more nozzles 6a. The number, the shape, the angle, etc. of the nozzles of the chamber 6 may be appropriately changed.

The heat exchanger 7 maintains the raw material characteristics by adjusting the temperature of the all-solid-state battery raw materials M (all-solid-state battery material E) performed by the atomization processing. The heat exchanger 7 has a structure of cooling from the outside of the flow path of the wet atomizer 1.

The wet atomizer 1 for processing the all-solid-state battery raw materials M is required to have a higher sealing property than in the case of processing a normal raw material. For example, when the oxide-based solid electrolyte material is processed, a higher sealing property is required so as not to oxidize the all-solid-state battery raw materials M. Further, in the case of processing the sulfide-based solid electrolyte material, a higher sealing property is required so as not to release a highly toxic gas to the outside due to the reaction of the all-solid-state battery raw materials M with moisture or water. In addition, when the sulfide-based solid electrolyte material is processed, the gas inside the wet atomizer 1 may be managed. For this reason, the wet atomizer 1 is required to have a structure of circulating the gas inside the wet atomizer 1 while ensuring the sealing property.

As shown in FIG. 2, the wet atomizer 1 according to the present embodiment includes a main body 1a, and a sealing member 1b. The sealing member 1b is connected to the upper portion of the main body 1a. The sealing property of the wet atomizer 1 is thus ensured. The raw material tank 2, the liquid supply pump 3, the pressure intensifier 4, the high-pressure filter 5, and the chamber 6 are disposed in the sealing member 1b.

The wet atomizer 1 includes an inert gas supply unit 8, and a gas circulation purification unit 9. The inert gas supply unit 8 supplies an inert gas F to the sealing member 1b. The gas circulation purification unit 9 circulates the inert gas F The main body 1a is a box-shaped base. The main body 1a accommodates a driving source (various pumps) for driving the liquid supply pump 3 and the pressure intensifier 4, and piping or the like. The main body 1a has a shape that covers the entire surface other than the upper surface of the rectangular parallelepiped or cube for ensuring the sealing property. The main body 1a has a vent hole or the like for ventilating with the outside.

The sealing member 1b is a box-shaped casing. The sealing member 1b seals the raw material tank 2, the liquid supply pump 3, the pressure intensifier 4, the high-pressure filter 5, and the chamber 6. The sealing member 1b has a shape that covers the entire surface other than the lower surface of the rectangular parallelepiped or cube for ensuring the sealing property. The sealing member 1b has a vent hole or the like for ventilating with the outside.

Figure 3:
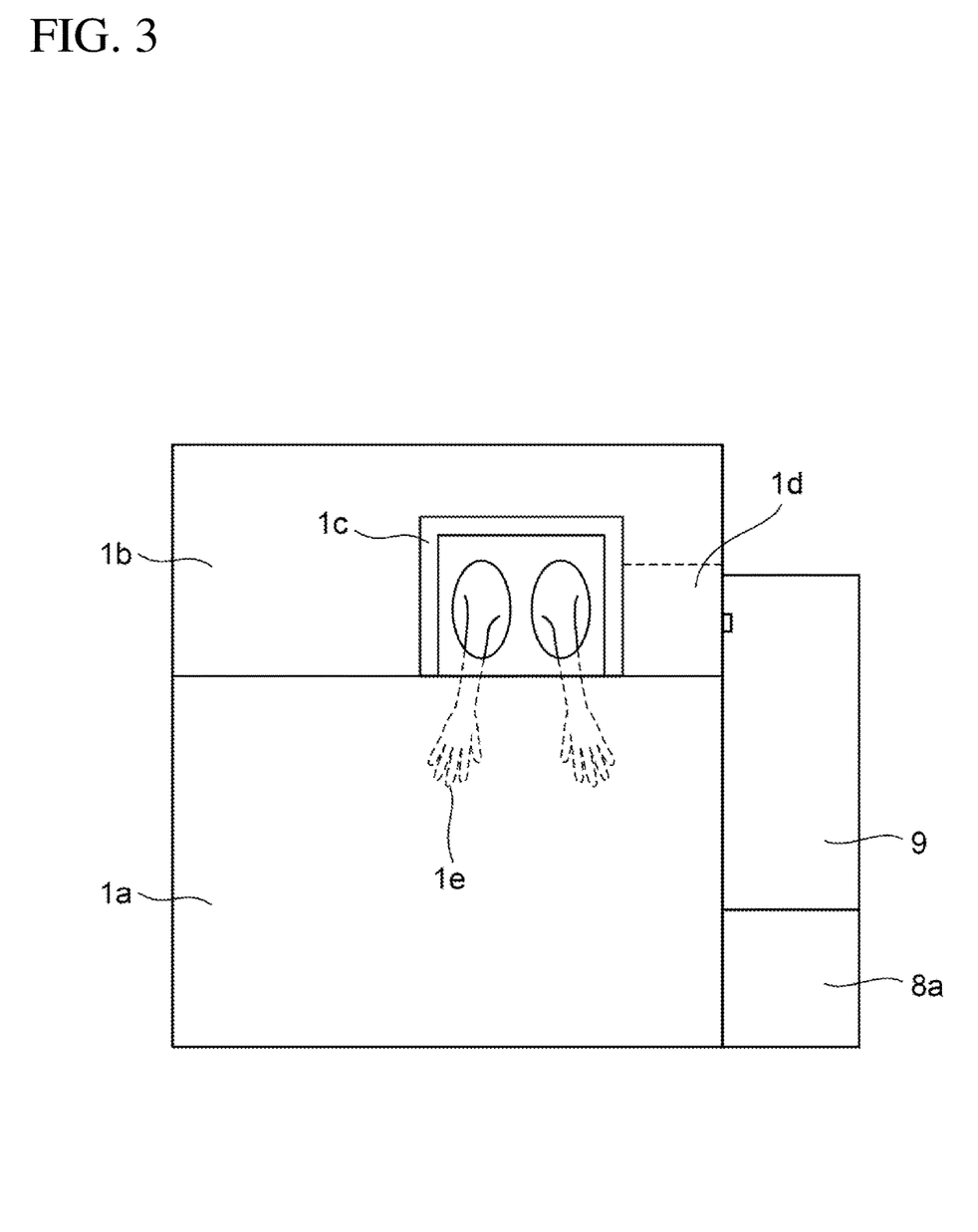
FIG. 3 is a front view of the wet atomizer according to the first embodiment.

The main body 1a and the sealing member 1b are sealed during the atomization processing. As shown in FIGS. 2 and 3, the sealing member 1b includes a work window 1c, and a take-out window 1d. The entire surface of the work window 1c is formed of a material having a high shielding property such as rubber or nylon. The work window 1c shields the inside and the outside of the sealing member 1b. The operator wearing the work glove 1e can move hands into and out of the sealing member 1b through the work window 1c. Although FIG. 3 shows one set of the work glove 1e and the work window 1c, the number and arrangement of the work glove 1e and the work window 1c, etc. may be appropriately increased depending on the situation of the main body 1a and the sealing member 1b.

The wet atomizer 1 includes an operation unit 16. The operation unit 16 operates the driving source for driving the liquid supply pump 3 and the pressure intensifier 4 or the like. By adjusting the buttons and knobs arranged in the operation unit 16, the pressure, speed, number or the like of the liquid supply pump 3 and the pressure intensifier 4 may be changed.

The operation unit 16 may also be used in an environment of the inert gas F. However, if the hydrogen sulfide is generated from the sulfide-based all-solid-state battery raw materials M, there is a possibility that the electronic components of the operation unit 16 may be deteriorated or damaged. Thus, at least one surface of the operation unit 16 is preferably disposed outside the sealing member 1b.

The take-out window 1d shields the inside and outside of the sealing member 1b. The all-solid-state battery raw materials M and the all-solid-state battery material E to be atomized are taken in or taken out through the take-out window 1d. The take-out window 1d is a box-shaped space. The take-out window 1d is formed inside or outside the sealing member 1b.

Figure 4:
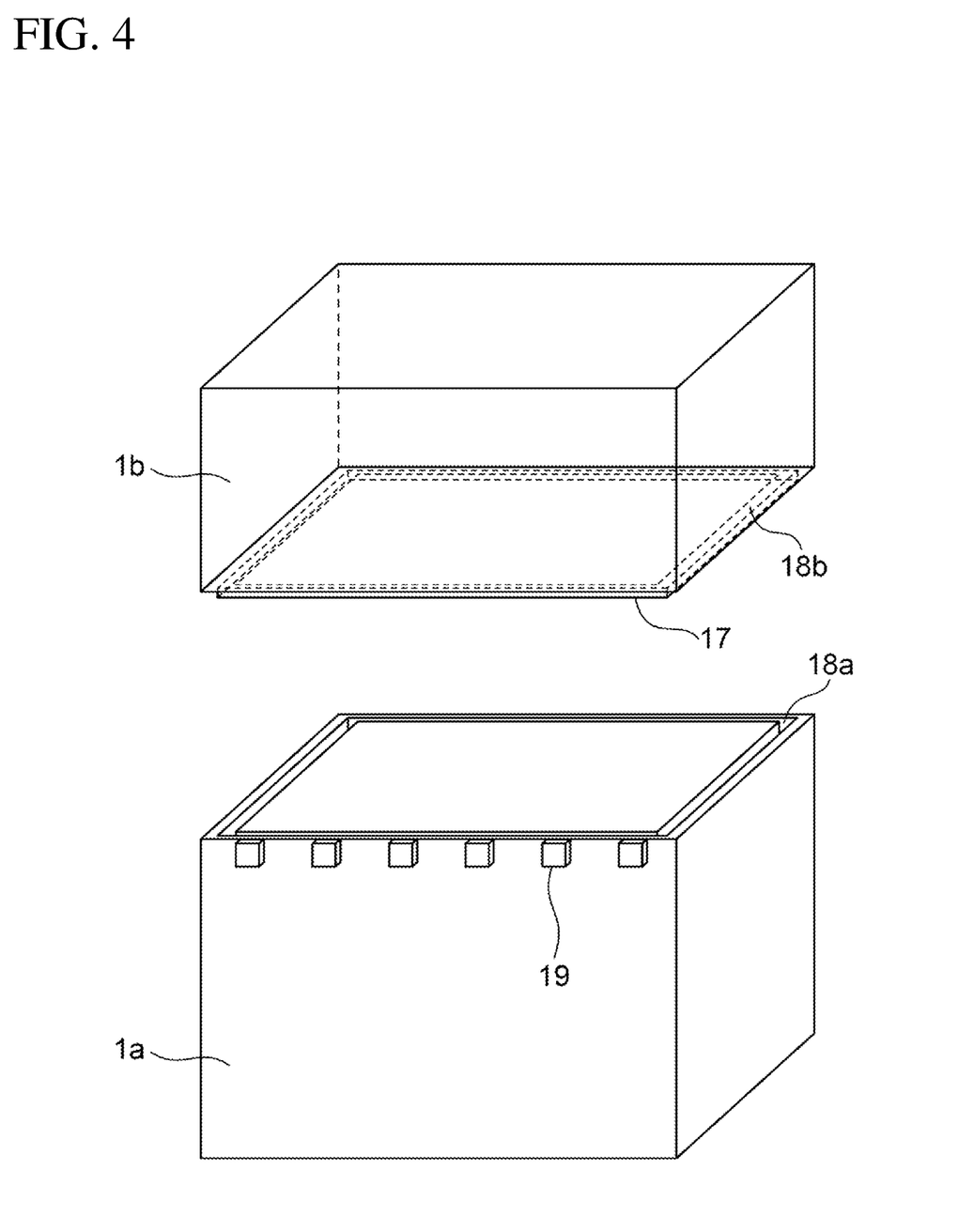
FIG. 4 is a perspective view showing a connecting portion of a main body and a sealing member of the wet atomizer according to the first embodiment.

As shown in FIG. 4, the main body 1a has a first seal groove 18a. The first seal groove 18a is formed on the peripheral portion of the upper surface of the main body 1a. The first seal groove 18a is formed on the entire periphery of the main body 1a. The sealing member 1b has a second seal groove 18b. The second seal groove 18b is formed on the peripheral portion of the lower surface of the sealing member 1b. The second seal groove 18b is formed on the entire periphery of the sealing member 1b.

A sealing element 17 is brought into close contact with the first seal groove 18a and the second seal groove 18b to fix the main body 1a and the sealing member 1b. The sealing element 17 is made of rubber, packing, or the like. The diameter of the sealing element 17 is preferably matched with the sum of the groove depth of the first seal groove 18a and the second seal groove 18b. This ensures the sealing property of the sealing member 1b. It is needless to say that if the sealing effect is insufficient in a single-layer structure as the sealing element 17, the sealing effect may be improved by arranging a multilayer structure or another member in a superimposed manner.

The main body 1a has a fixing member 19. The fixing member 19 fixes the sealing member 1b and the main body 1a with the sealing member 1b and the main body 1a connected to each other. The fixing member 19 may be any member capable of fixing two or more members. The fixing member 19 is, for example, a clamping component.

In the present specification, as shown in FIGS. 2 to 6, the configuration of connecting and fixing the sealing member 1b so as to widely cover the entire upper surface of the main body 1a is described. A main portion or portion of performing to supply the all-solid-state battery raw materials M with the raw material tank 2, the liquid supply pump 3, the pressure intensifier 4, the high-pressure filter 5, the chamber 6, or pipes (not shown) may be covered.

The inert gas supply unit 8 includes an inert gas supply source 8a for supplying the inert gas F to the sealing member 1b. The inert gas F is, for example, nitrogen or argon. Filling the sealing member 1b with the inert gas F prevents the gas from activating even if the all-solid-state battery raw materials M (sulfide-based solid electrolyte material) reacts with water to generate a highly toxic gas derived from sulfide.

The inert gas supply unit 8 may include a first inert gas supply path 8b and a second inert gas supply path 8c. The first inert gas supply path 8b supplies the inert gas F to the sealing member 1b. The second inert gas supply path 8c supplies the inert gas F to the raw material tank 2.

The second inert gas supply path 8c removes the dissolved oxygen remaining in the all-solid-state battery raw materials M to be stored in the raw material tank 2. This prevents oxidation of the all-solid-state battery raw materials M and the all-solid-state battery material E.

Figure 5:
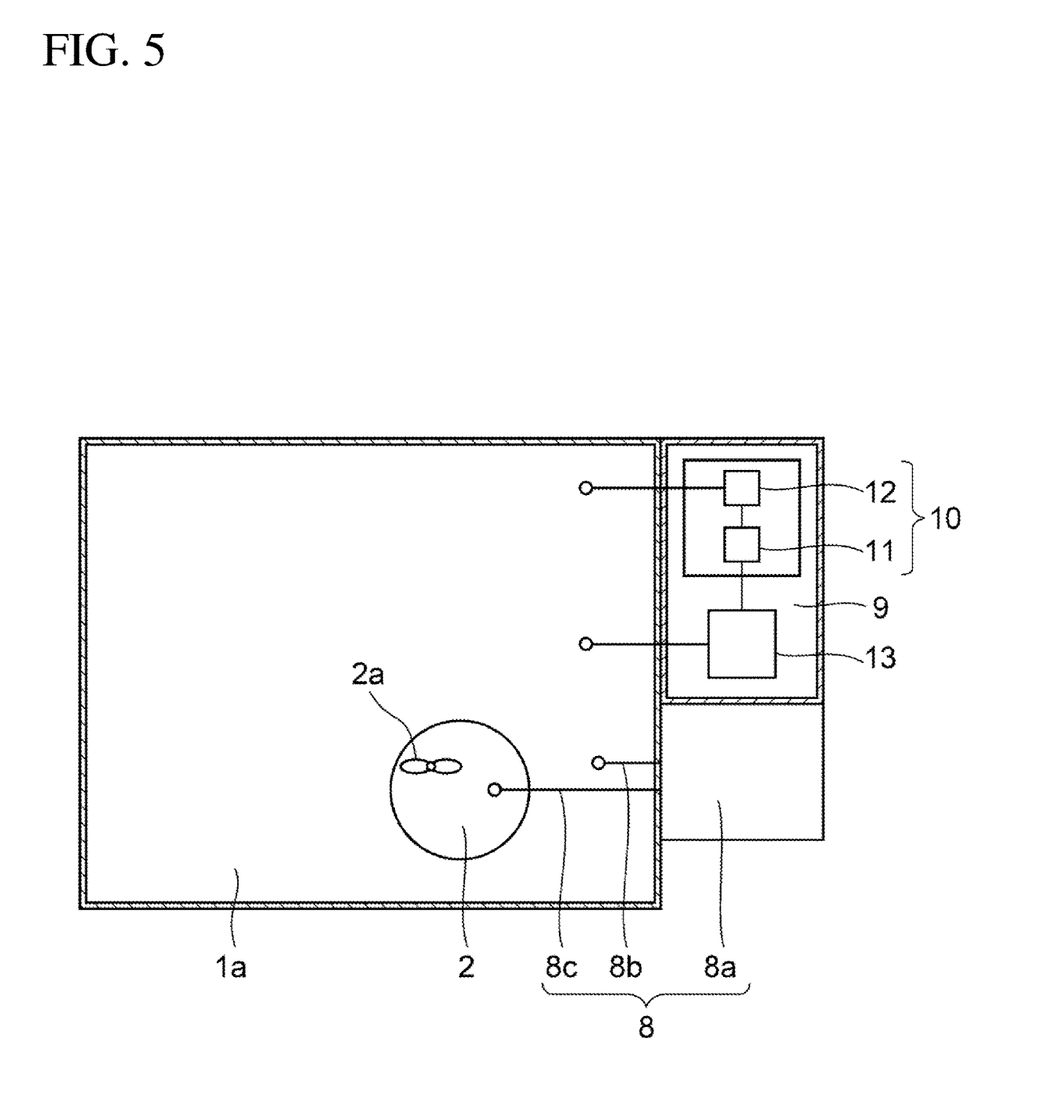
FIG. 5 is a top view showing details of a gas circulation purification unit of the wet atomizer according to the first embodiment.

As shown in FIG. 5, a stirring rod 2a may be disposed in the raw material tank 2. Stirring the all-solid-state battery raw materials M with the stirring rod 2a prevents oxidation of the all-solid-state battery raw materials M.

The gas circulation purification unit 9 ensures the safety of the gas in the sealing member 1b. In particular, when the sulfide-based electrolyte material or the like is atomized, even if the highly toxic gas or the like is generated, the gas circulation purification unit 9 performs a processing of sucking the highly toxic gas to reduce toxicity. The gas circulation purification unit 9 is disposed outside or inside the main body 1a.

As shown in FIG. 5, the gas circulation purification unit 9 includes a purification unit 10 and a blower unit 13. When the highly toxic gas or the like is generated, the purification unit 10 performs a process of reducing toxicity. The purification unit 10 includes an oxygen adsorption portion 11 and a moisture adsorption portion 12. The blower unit 13 blows air for appropriately circulating the inert gas F in the sealing member 1b.

The inside of the sealing member 1b is filled with the inert gas F. The oxygen adsorption portion 11 and the moisture adsorption portion 12 have a catalyst or a porous body. When the highly toxic gas or the like is generated, the catalyst or the porous body of the oxygen adsorption portion 11 and the moisture adsorption portion 12 adsorbs or replaces the highly toxic gas or the like together with the inert gas F. Thus, the gas circulation purification unit 9 reduces the toxicity inside the sealing member 1b.

Specifically, hydrogen sulfide irritates the mucosa of the eye when the concentration of hydrogen sulfide in the space exceeds 10 ppm, causing harm to the human body. Thus, it is preferable to continuously ventilate for the hydrogen sulfide concentration not to exceed 10 ppm. The inert gas supply unit 8 and the gas circulation purification unit 9 keep the hydrogen sulfide concentration in the sealing member 1b to 10 ppm or less, which ensures safety of the operator.

The inside state of the sealing member 1b to be sealed can not be managed from the outside. In order to appropriately acquire various internal numerical values, it is preferable to appropriately dispose a sensor or the like inside the sealing member 1b. In particular, in order to appropriately operate the gas circulation purification unit 9, it is preferable to appropriately manage the concentration of oxygen and moisture in the sealing member 1b. Thus, an oxygen densitometer 14 and a moisture densitometer 15 is preferably disposed in the sealing member 1b. This allows to manage the sealing property and safety of the sealing member 1b.

It is necessary to process the all-solid-state battery raw materials M after ensuring safety. Minimizing contamination that is an impurity in the wet atomizer 1 enables to improve the quality or to secure higher safety of the all-solid-state battery material E. More specifically, although depending on the type of contamination, in case where the contamination is metal or the like, the all-solid-state battery raw materials M including the contamination becomes high pressure and high temperature when passing through the wet atomizer 1, which causes the contamination to be separated and diffused, or to be black. If left as it is, the capacity of all-solid-state battery material E may be adversely affected. As another embodiment of the chamber 6 in consideration of such contaminants, as shown in FIG. 7, the chamber 6 includes a nozzle 6a, a collider (ball) 6b, a pressure chamber 6c, and a ceramic wall 6d.

The nozzle 6a, which takes the all-solid-state battery raw materials M pressurized by the pressure intensifier 4 into the chamber 6, increases the collision energy by the flow path having a reduced diameter. The collider (ball) 6b atomizes the all-solid-state battery raw materials M with high collision energy by collision, and forms a flow by rotationally disturbing inside the pressure chamber 6c due to the collision of the all-solid-state battery raw materials M. The pressure chamber 6c, which is an internal space of the chamber 6, is a place where the all-solid-state battery raw materials M are processed. The ceramic wall 6d is a wall disposed on the surface of the pressure chamber 6c.

Figure 7:
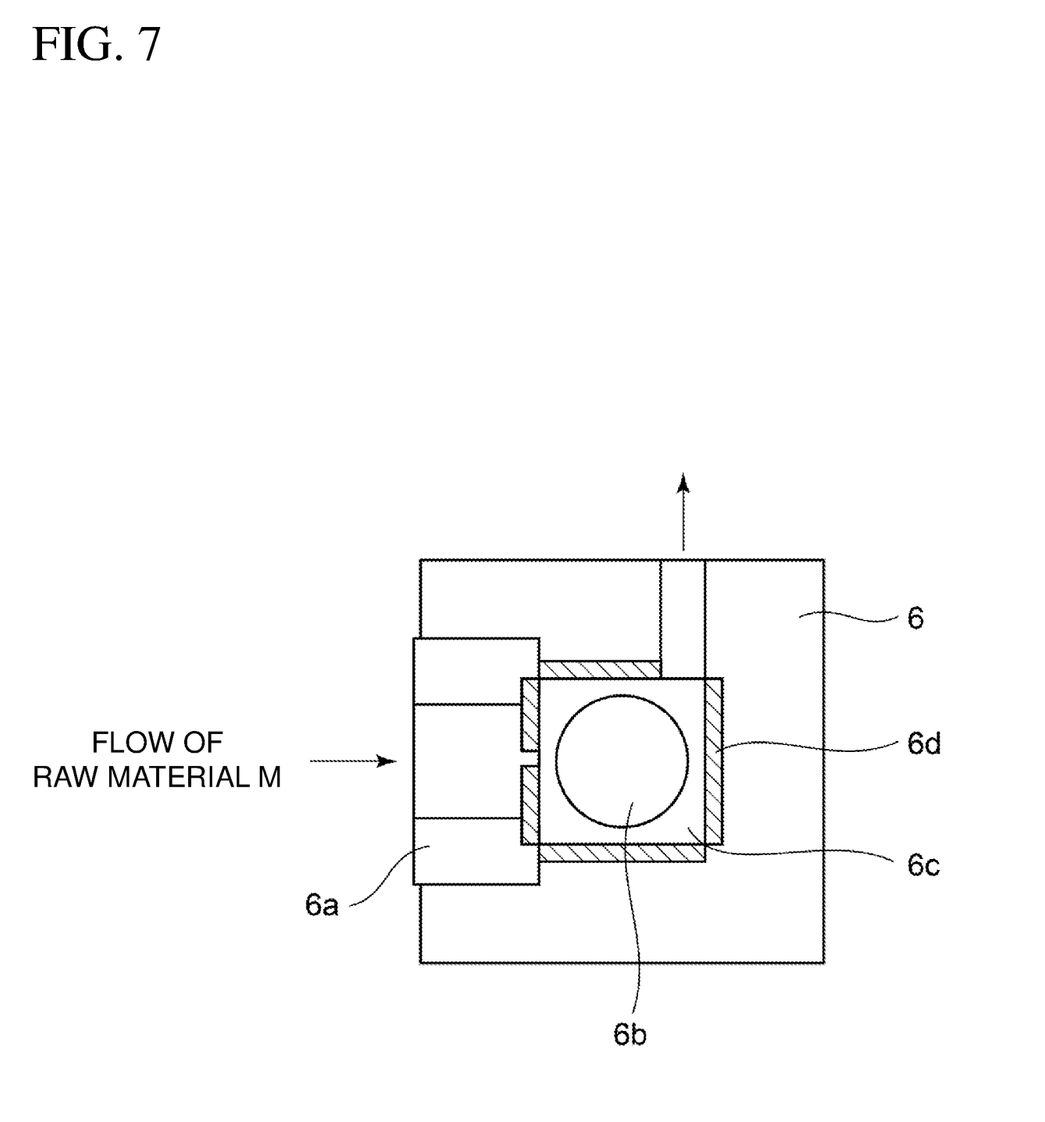
FIG. 7 is a front view of a wet atomizer according to a third embodiment.

To reduce the contact area of the all-solid-state raw battery materials M in the internal space of the chamber 6, as shown in FIG. 7, it is effective to form a groove at the tip of the nozzle 6a to be engaged with one surface of the ceramic wall 6d. As long as the contact area of the all-solid-state battery raw materials M and the contamination less effect is obtained, the ceramic wall 6d is not necessarily arranged with respect to the entire surface of the chamber 6 or the pressure chamber 6c. The ceramic wall 6d may be arranged in at least one surface of the chamber 6 or the pressure chamber 6c.

In order to obtain the contamination less effect, the wear resistance of the portion where the all-solid-state battery raw materials M collide is required or the peeling of the surface due to the solvent needs to be suppressed. Thus, it is effective to configure the collider (ball) 6b with a ceramic material such as zirconia, or to arrange or form the ceramic wall 6d on the surface in the pressure chamber 6c.

To confirm the wear resistance of the portion where the all-solid-state battery raw materials M collide or the peeling of the surface due to the solvent is suppressed, the slurry containing the all-solid-state battery raw materials M was charged in the wet atomizer 1 using the chamber 6 shown in FIG. 7, and the process of high-pressure injection with 200 MPa was carried out 50 times. As a result, no discoloration or the like of the all-solid-state battery raw materials M or the all-solid-state battery material E was observed.

In the present specification, the description has been focused on the contamination in the chamber 6, but it is needless to say that the wear resistance and the like can be enhanced by applying a ceramic material or a ceramic coating to each element of the wet atomizer 1.

Hereinafter, a processing sequence of the wet atomizer 1 according to the present embodiment will be described.

Firstly, operating the gas circulation purification unit 9 to fill the sealing member 1b with the inert gas F. Then, checking whether the acquired values of the oxygen densitometer 14 and the moisture densitometer 15 are appropriate.

Next, the container containing the all-solid-state battery raw materials M is temporarily taken into the take-out window 1d. Then, the operator uses the work glove 1e to put his/her hand into the work window 1c, and takes the container containing the all-solid-state battery raw materials M arranged in the take-out window 1d. The operator puts the all-solid-state battery raw materials M into the raw material tank 2 and adjusts them.

Next, the liquid supply pump 3 supplies the all-solid-state battery raw materials M in the raw material tank 2 to the pressure chamber of the pressure intensifier 4. The supplied all-solid-state battery raw materials M are pressurized by the pressure intensifier 4. The pressurized all-solid-state battery raw materials M pass through the high-pressure filter 5 to be supplied to and injected to the chamber 6. This processing may be repeated not only once but also a plurality of times.

When the highly toxic gas or the like is generated from the all-solid-state battery raw materials M, the catalyst and the porous body of the oxygen adsorption portion 11 and the moisture adsorption portion 12 replace the highly toxic gas together with the inert gas F at the purification unit 10 of the gas circulation purification unit 9

When the atomization process is completed, the all-solid-state battery materials E stored in the raw material tank 2 are put in a container to be arranged in the take-out window 1d from the inside of the sealing member 1b. Then, the container of the all-solid-state battery materials E is taken out to the outside of the sealing member 1b through the take-out window 1d.

As the gas is invisible, it is preferable to perform maintenance after the atomization process and the all-solid-state battery material E is completely taken out. The maintenance is, for example, cleaning of the wet atomizer 1 with various liquids such as water, a solvent for cleaning or sterilization, a circulation of gas by the gas circulation purification unit 9, and suction of gas inside by a suction device (not shown)

Based on the processing sequence, 50 ml of slurry containing the all-solid-state battery raw materials M (sulfide-based solid electrolyte material, oxide-based solid electrolyte material) is put in the wet atomizer 1 as shown in FIG. 1 with the inert gas F filled in the sealing member 1b, and the slurry was injected 10 times at high pressure of 200 MPa. As a result, the particle diameters of the all-solid-state battery raw materials M (sulfide-based solid electrolyte material, oxide-based solid electrolyte material) and the all-solid-state battery material E were reduced to 1 μm or less.

In addition, neither leakage of hydrogen sulfide in the processing of the sulfide-based solid electrolyte material, nor oxidation of the oxide-based solid electrolyte material was observed.

Second Embodiment

In the wet atomizer 1 according to the first embodiment, the operator wearing the work glove 1e performs the work manually through the work window 1c.

Figure 6:
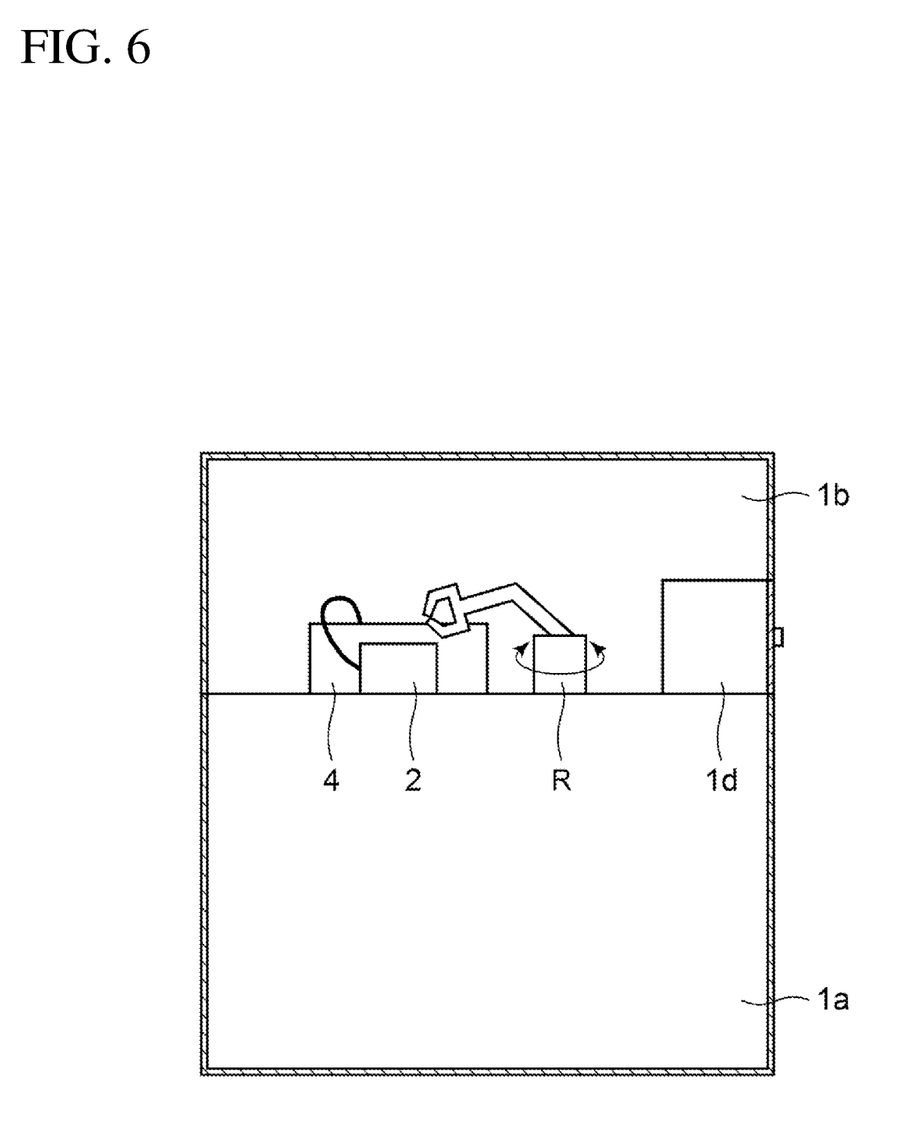
FIG. 6 is a front view of a wet atomizer according to a second embodiment.

However, in consideration of the danger in refining the sulfide-based all-solid-state battery raw materials M and the improvement of the mass production system, it is preferable to improve the work efficiency by automation. As shown in FIG. 6, the wet atomizer 1 according to the present embodiment includes a work robot R. The other basic configuration of the present embodiment is the same as that of the wet atomizer 1 according to the first embodiment.

The work robot R is disposed between the take-out window 1d and the raw material tank 2. By moving the work robot R back and forth, and right and left, the all-solid-state battery raw materials M are put into the raw material tank 2 from the container.

The work robot R includes a tool at its distal end for detachably attaching the container. Further, the work robot R moves back and forth, and left and right by a driving source such as a motor.

The work robot R is not limited to an articulated robot, and may be a simple moving mechanism that slides back and forth or right and left along one axis.

Third Embodiment

The all-solid-state battery raw materials M need to be processed after ensuring safety. Minimizing contaminants, which are impurities, in the wet atomizer 1 improves the quality of the all-solid-state battery raw materials E and secures higher safety.

FIG. 7 shows a chamber 6 according to a third embodiment in consideration of contamination-less configuration. The chamber 6 according to the present embodiment includes a nozzle 6a, a collider (ball) 6b, a pressure chamber 6c, and a ceramic wall 6d.

The nozzle 6a takes the all-solid-state battery raw materials M pressurized by the pressure intensifier 4 into the chamber 6. Reducing the diameter of the flow path in the nozzle 6a increases the collision energy. The all-solid-state battery raw materials M having an increased collision energy collide with the collider 6b. As a result, the all-solid-state battery raw materials M are atomized. The collision of the all-solid-state raw battery materials M cause the collider 6b to rotate and disturb in the pressure chamber 6c to form a flow. The pressure chamber 6c, which is an internal space of the chamber 6, processes the all-solid-state battery raw materials M. The ceramic wall 6d is disposed on the surface of the pressure chamber 6c.

Contamination is reduced by suppressing the wear resistance of the portion where the all-solid-state battery raw materials M collide, and the peeling off or the like at the surface by the solvent. Thus, it is preferable that the collider 6b is made of a ceramic material, or that the ceramic wall 6d is disposed or formed on the surface of the pressure chamber 6c.

In the present specification, the description has been focused on the contamination-less chamber 6, but it is needless to say that the wear resistance or the like can be enhanced by applying the ceramic material or the ceramic coating to each of the elements of the wet atomizer 1.

As described above, the present invention is not limited to the above-described embodiment, and it is needless to say that the present invention can be appropriately modified without departing from the gist thereof.

What is claimed is:

1. A wet atomizer, comprising:
   a raw material tank configured to store all-solid-state battery raw materials;
   a liquid supply pump configured to supply the all-solid-state battery raw materials;
   a pressure intensifier configured to pressurize the all-solid-state battery raw materials supplied from the liquid supply pump;
   a high-pressure filter configured to filter the all-solid-state battery raw materials pressurized by the pressure intensifier;
   a chamber configured to inject the all-solid-state battery raw materials filtered by the high-pressure filter;
   a sealing member configured to seal a space for processing the all-solid-state battery raw materials;
   an inert gas supply unit configured to supply inert gas to the sealing member;
   a main body configured to be sealed with the sealing member; and
   a sealing element configured to seal the main body and the sealing member,
   wherein the raw material tank, the liquid supply pump, the pressure intensifier, the high-pressure filter, and the chamber are disposed in the sealing member.

2. The wet atomizer according to claim 1, wherein the inert gas supply unit includes
   an gas supply source configured to supply the inert gas,
   a first inert gas supply path connecting the inert gas supply source to the sealing member, and
   a second inert gas supply path connecting the inert gas supply source to the raw material tank.

3. The wet atomizer according to claim 1, wherein the main body has a first seal groove along an entire periphery,
   the sealing member has a second seal groove along an entire periphery, and
   the sealing element is fitted between the first seal groove and the second seal groove.

4. The wet atomizer according to claim 1, wherein the chamber includes a ceramic wall on at least one surface inside the chamber.

5. The wet atomizer according to claim 1, wherein the all-solid-state battery raw materials is sulfide-based solid electrolyte material.

6. The wet atomizer according to claim 1, wherein the inert gas supply unit supply nitrogen or argon to the sealing member.

7. The wet atomizer according to claim 1, further comprising:
   a gas circulation purification unit configured to circulate and purify the inert gas.

8. The wet atomizer according to claim 7, wherein the gas circulation purification unit includes
   a purification unit configured to purify the inert gas or gas generated in the sealing member, and
   a blower unit configured to circulate the inert gas or gas generated in the sealing member.

9. The wet atomizer according to claim 1, wherein the sealing member includes
   a work glove operable under sealing environment inside the sealing member,
   a work window configured to dispose the work glove, and
   a take-out window configured to take in or take out the all-solid-state battery raw materials.

10. The wet atomizer according to claim 1, wherein the sealing member includes a work robot configured to move the all-solid-state battery raw materials.

11. The wet atomizer according to claim 2, wherein
the main body has a first seal groove along an entire periphery,
the sealing member has a second seal groove along an entire periphery, and
the sealing element is fitted between the first seal groove and the second seal groove.

12. The wet atomizer according to claim 2, wherein the chamber includes a ceramic wall on at least one surface inside the chamber.

13. The wet atomizer according to claim 3, wherein the chamber includes a ceramic wall on at least one surface inside the chamber.

14. The wet atomizer according to claim 2, wherein the all-solid-state battery raw materials is sulfide-based solid electrolyte material.

15. The wet atomizer according to claim 3, wherein the all-solid-state battery raw materials is sulfide-based solid electrolyte material.

16. The wet atomizer according to claim 4, wherein the all-solid-state battery raw materials is sulfide-based solid electrolyte material.

17. The wet atomizer according to claim 2, further comprising:
a gas circulation purification unit configured to circulate and purify the inert gas.

18. The wet atomizer according to claim 3, further comprising:
a gas circulation purification unit configured to circulate and purify the inert gas.

19. The wet atomizer according to claim 4, further comprising:
a gas circulation purification unit configured to circulate and purify the inert gas.

20. The wet atomizer according to claim 5, further comprising:
a gas circulation purification unit configured to circulate and purify the inert gas.

* * * * *